US012710589B2

(12) United States Patent
Krasnokutska et al.

(10) Patent No.: US 12,710,589 B2
(45) Date of Patent: Aug. 18, 2026

(54) METHODS AND APPARATUS FOR OPTICAL COUPLER

(71) Applicant: XANADU QUANTUM TECHNOLOGIES INC., Toronto (CA)

(72) Inventors: Inna Krasnokutska, Toronto (CA); Blair Morrison, Toronto (CA)

(73) Assignee: XANADU QUANTUM TECHNOLOGIES INC., Toronto (CA)

( * ) Notice: Subject to any disclaimer, the term of this patent is extended or adjusted under 35 U.S.C. 154(b) by 340 days.

(21) Appl. No.: 18/518,732

(22) Filed: Nov. 24, 2023

(65) Prior Publication Data

US 2024/0184043 A1 Jun. 6, 2024

Related U.S. Application Data

(60) Provisional application No. 63/430,395, filed on Dec. 6, 2022.

(51) Int. Cl.
*G02B 6/122* (2006.01)
*G02B 6/30* (2006.01)

(52) U.S. Cl.
CPC .......... *G02B 6/1228* (2013.01); *G02B 6/305* (2013.01)

(58) Field of Classification Search
CPC .............................. G02B 6/1228; G02B 6/305
See application file for complete search history.

(56) References Cited

U.S. PATENT DOCUMENTS 6,411,765 B1 6/2002 Ono
2012/0230635 A1* 9/2012 Yoshida ................ G02B 6/125 385/43
2015/0010266 A1 1/2015 Webster et al.
2018/0017732 A1 1/2018 Tassaert
2018/0067259 A1 3/2018 Teng et al.
(Continued)

FOREIGN PATENT DOCUMENTS

CN 111367016 A 7/2020
EP 3671298 A1 6/2020

OTHER PUBLICATIONS

R. Marchetti, C. Lacava, L. Carroll, K. Gradkowski, P. Minzioni, "Coupling Strategies for Silicon Photonics Integrated Chips". Photonics Research, vol. 7, No. 2, Feb. 2019.

*Primary Examiner* — Michael P Mooney
(74) *Attorney, Agent, or Firm* — Norton Rose Fulbright Canada LLP

(57) ABSTRACT

There is described an adiabatic edge coupler comprising two coupled waveguides. A first waveguide extends from a tip width to a terminal width. A second waveguide comprises a first tapered portion that extends from a tip width to an intermediate width, and a second tapered portion that extends from the intermediate width to a terminal width. Upon receipt of an input optical signal, a coupled mode is formed between the two coupled waveguides. Over the first tapered portion, the coupled mode is adiabatically transformed onto the first waveguide. The coupled mode then decouples from the second waveguide over the second tapered portion. The adiabatic transformer enables low loss, small footprint, and fabrication-tolerant in-chip propagation of the coupled mode with relatively simplified fabrication processes and small critical dimensions.

18 Claims, 7 Drawing Sheets

(56) References Cited

U.S. PATENT DOCUMENTS

2019/0384003 A1* 12/2019 Painchaud ........... G02B 6/2821
2021/0026074 A1 1/2021 Horth
2021/0088724 A1 3/2021 Liu et al.
2021/0341675 A1 11/2021 Su et al.
2021/0373243 A1* 12/2021 Krueger ................. G02B 6/305
2022/0244459 A1 8/2022 Bruck et al.

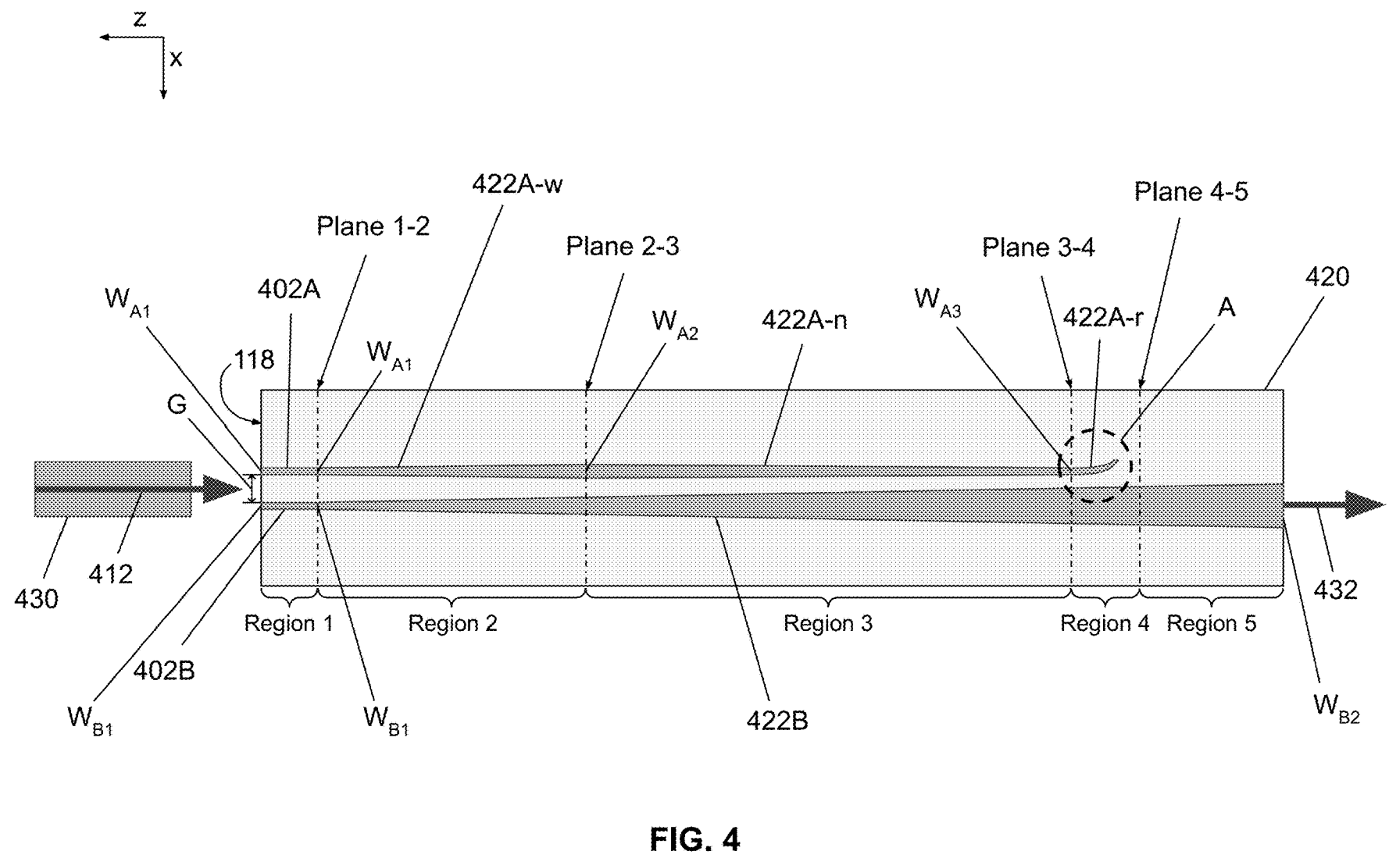

* cited by examiner 420
432
$W_{B2}$
Plane 4-5
A
Region 5
422A-r
Region 4
Plane 3-4
$W_{A3}$
Region 3
422A-n
422B
$W_{A2}$
Plane 2-3
422A-w
Region 2
$W_{A1}$
Plane 1-2
$W_{B1}$
402A
Region 1
118
G
$W_{A1}$
402B
412
$W_{B1}$
430
z
x

FIG. 4

METHODS AND APPARATUS FOR OPTICAL COUPLER

CROSS-REFERENCE TO RELATED APPLICATIONS

This application claims the benefit of, and priority to, U.S. Provisional Patent Application No. 63/430,395, filed Dec. 6, 2022 and titled "Methods and Apparatus for Optical Coupler," the entire content of which is incorporated herein by reference for all purposes.

BACKGROUND OF THE INVENTION

The present application relates to optical edge couplers, and in particular to edge couplers for optical signal communication.

One of the challenges in optical signal communication is the efficient edge coupling between optical fibres and integrated optical waveguides. Typically, optical fibres have a mode size that is five to ten times larger than that of the integrated waveguide. The mismatch of the modal sizes between the different optical mediums could result in significant optical loss.

Accordingly, it is desirable to provide an improved method and system of an optical edge coupler that is capable of providing efficient optical coupling with low insertion loss while offering the flexibility to at least partially overcome fabrication errors and large device footprint due to lengthy transformer dimensions.

SUMMARY OF THE INVENTION

In one aspect, there is provided an optical edge coupler with two waveguides formed within one cladding layer of the coupler configured to function as a single transformer, where the two waveguides are configured with unique profiles that may improve the mode overlap between the coupler and the optical fibres having small or medium (i.e., ≤8 μm) mode field diameters (MFDs). The coupler disclosed herein may be extended to mode match with SMF-28 fibres.

In a further aspect, the optical edge coupler disclosed herein may provide improved tolerance to dimensional variations of the coupler, such as the dimensions of the waveguides in the coupler, without compromising the optical performance of the coupler. Additionally, the optical performance of some embodiments of the optical edge coupler described herein may not be restricted by the fabrication critical dimensions provided to users through fabrication entities.

In a further aspect, the optical edge coupler disclosed herein may provide improved tolerance to mode misalignment between the fibre and the waveguides in the coupler.

In a further aspect, the present disclosure provides an optical edge coupler with reduced device footprint, thereby permitting greater integration density.

In a further aspect, the present disclosure provides a one-layer optical edge coupler that is suited for a one-step fabrication process, hence lowering fabrication and device cost.

In a further aspect, the present disclosure provides an adiabatic optical edge coupler with reduced levels of insertion loss.

According to a first example aspect, there is provided an optical coupler comprising: a substrate; a cladding layer supported above the substrate, the cladding layer and the substrate defining a facet; a first optical waveguide arranged within the cladding layer; a second optical waveguide arranged substantially parallel to with the first optical waveguide and spaced apart from the first optical waveguide by a transverse distance at the facet, the second optical waveguide comprising a first tapered portion and a second tapered portion, wherein an optical signal transmitted along the first and second optical waveguides is transformed onto the first optical waveguide over the first tapered portion, and the optical signal is decoupled from the second optical waveguide over the second tapered portion.

According to a second example aspect, there is provided a method of optically coupling a light source and an optical circuit, the method comprising: receiving an input optical mode from the light source at a chip facet of an optical coupler by a first optical waveguide and a second optical waveguide; causing an optical mode to be optically coupled between the first optical waveguide and the second optical waveguide; transforming the optical mode onto the first waveguide over a first tapered portion of the second optical waveguide; and decoupling the optical mode from the second optical waveguide over a second tapered portion of the second optical waveguide.

In any of the above aspects, the first optical waveguide may widen from a first tip width at the facet to a first terminating width at a first terminal end.

In any of the above aspects, the first tapered portion may widen from a second tip width to an intermediate width; and the second tapered portion may narrow from the intermediate width to a second terminating width at a second terminal end.

In any of the above aspects, the first tip width may be substantially equal to the second tip width.

In any of the above aspects, each of the first optical waveguide and the second optical waveguide may further comprise an extension portion, respectively.

In any of the above aspects, the extension portion of each of the first and second optical waveguide may be of uniform width.

In any of the above aspects, one or more of the transverse distance, the first tip width, and the second tip width may be configured to mode match with an external light source optically connected to the optical coupler at the facet.

In any of the above aspects, the first optical waveguide and the second optical waveguide may be ribbed waveguides.

In any of the above aspects, the second tapered portion may have a length of at least 4% of a total length of the second optical waveguide.

In any of the above aspects, the second optical waveguide may further comprise a radiation tip extending from the second tapered portion, the radiation tip configured to reduce optical reflections within the second optical waveguide.

In any of the above aspects, the radiation tip may be configured with one or more of a curved profile and a narrowing tip.

In any of the above aspects, the first optical waveguide may be configured with a first tapering angle; the first tapered portion may be configured with a second tapering angle; and the second tapered portion may be configured with a third tapering angle.

In any of the above aspects, the first tapering angle may be greater than the second tapering angle.

In any of the above aspects, each of the first tapering angle, the second tapering angle, and the third tapering angle may be one of a constant tapering angle, a polynomial tapering angle, and a discrete step tapering angle.

Any one of the above aspects may further comprise reducing reflections in the second optical waveguide with a radiation tip that extends from the second tapered portion.

Any one of the above aspects may further comprise configuring one of a gap distance between the first optical waveguide and the second optical waveguide at the chip facet, a first width of the first optical waveguide at the chip facet, and a second width of the second optical waveguide at the chip facet for mode matching with the light source.

Any one of the above aspects may further comprise configuring the first optical waveguide with a first tapering angle; configuring the first tapered portion with a second tapering angle; and configuring the second tapered portion with a third tapering angle; wherein the first tapering angle is greater than the second tapering angle.

Any one of the above aspects may further comprise configuring the first tapered portion to extend from a first width to a second width; configuring the second tapered portion to extend from the second width to a third width; and configuring the second width based on one or more of a total length of the second optical waveguide, a gap distance between the first and the second optical waveguides at the chip facet, and tip widths of the first and second optical waveguides at the chip facet.

Any one of the above aspects may further comprise configuring each of the first tapering angle, the second tapering angle, and the third tapering angle as one of a constant tapering angle, a polynomial tapering angle, and a discrete step tapering angle.

BRIEF DESCRIPTION OF DRAWINGS

Reference will now be made, byway of example, to the accompanying figures which show example embodiments of the present application, and in which:

FIG. 4 illustrates a cross-sectional top view of the optical coupler shown in FIGS. 1A and 1B showing the longitudinal profiles of the waveguides;

Like reference numerals are used throughout the figures to denote similar elements and features. While aspects of the invention will be described in conjunction with the illustrated embodiments, it will be understood that it is not intended to limit the invention to such embodiments.

DETAILED DESCRIPTION OF THE INVENTION

Figures 1A, 1B:
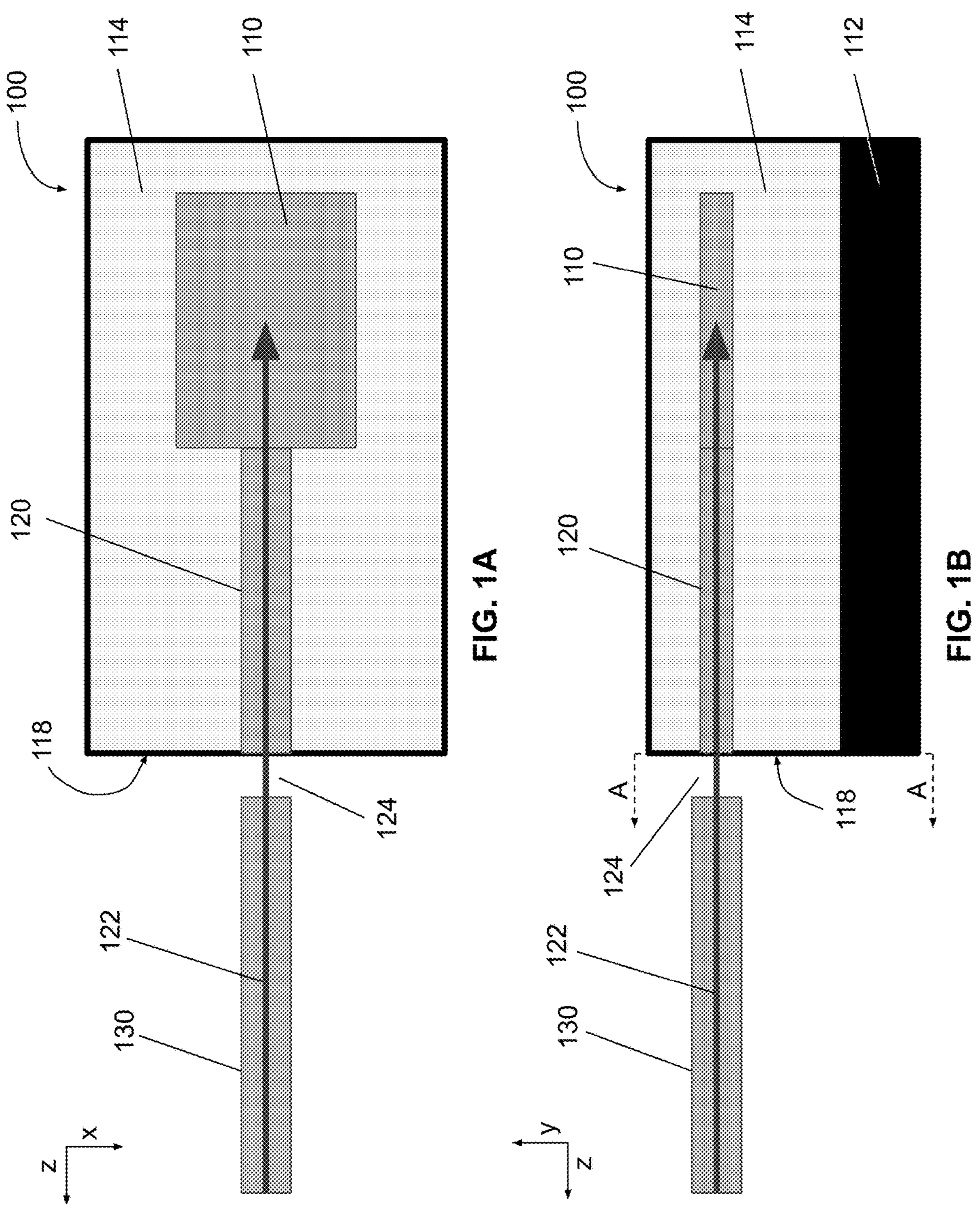
FIG. 1A illustrates a cross-sectional top view of an exemplary photonic optical system in accordance with the present disclosure.
FIG. 1B illustrates a cross-sectional side view of the photonic optical system in FIG. 1A.

Silicon photonics in the implementation of photonic integrated circuits (PIC) has gained increasing traction as a viable technology, particularly in the area of quantum computing, due to its technological maturity, low fabrication cost, high integration density, and compatibility with existing fabrication methodologies. With the advent of the semiconductor fabrication process, the size of PIC elements has been greatly reduced, resulting in higher integration density. However, this has also led to increased modal mismatch between external (i.e., not integrated) optical sources, such as fibre cables, and integrated waveguides, which may cause significant optical coupling loss that could potentially jeopardize the signal integrity of the entire system. Mode matching may be especially challenging for systems having high or medium refractive index contrast between the waveguide and surrounding cladding material, which may be desired to achieve total internal reflection of the optical signal. Thus, optical edge couplers configured to facilitate optical communication between an external light source (e.g., fibre optical cable or laser source) and an integrated silicon waveguide at a high optical efficiency becomes a crucial design element in any integrated silicon photonic system.

One way to minimize optical coupling loss is the use of inversely tapered waveguides where the tapered waveguide expands from a first narrower width at the chip facet to a wider second width. The decreased waveguide dimensions at the chip facet may increase the mode size due to mode radiation into the cladding. The inverse taper design is used to expand the output waveguide mode and minimize the mode mismatch between the optical fibre and the integrated waveguide. However, the challenges with this approach include undesired asymmetric mode profile, difficulty in achieving fabrication tolerances, and limitations due to material properties and critical dimensions. Furthermore, inverse tapers may also require long mode transformers to convert the mode from the chip facet to the mode in the PIC.

Another approach to minimize optical coupling loss is to modify the optical fibre itself. In this scheme, fibres with small mode field diameters (MFDs) may be fabricated either by engineering the fibre tip such as tapering or customizing the fibre index profile. However, this method is often associated with manufacturing complications such as the difficulty in achieving fabrication and misalignment tolerances, elliptical mode profile, and limited availability of mode sizes. In addition, the modified fibre still retains the core inefficiency issue due to splicing losses and induced fibre losses.

In both the above approaches, even a small variation in the mode size or in the physical profile of either the waveguide or the fibre can lead to imperfect mode overlap and result in elevated levels of optical coupling loss.

Methods and systems described herein provide an adiabatic optical coupling device configured to couple an external light source, such as a laser source or a fibre optical cable, to an integrated waveguide on a PIC for both classical and quantum photonic applications. In one exemplary embodiment, the optical coupler described herein includes two waveguides fabricated within one optical device layer of a PIC. Upon receiving an input optical mode from the external source, a coupled optical mode is formed between the waveguides. A first waveguide has an inverse tapered longitudinal profile that extends from a chip facet to an integrated waveguide of the PIC. A second waveguide is parallel to the first waveguide and comprises at least two tapered portions. A first tapered portion widens from a first width at the chip facet to a second intermediate width. A second tapered portion narrows from the second intermediate width to a third terminal width. The difference in lateral tapering profile between the two waveguides over the first tapered portion and corresponding sections of the first waveguide causes the coupled mode to be gradually transferred onto the first waveguide. Over the second tapered portion and its corresponding sections of the first waveguide, the coupled mode gradually decouples from the second waveguide.

FIGS. 1A and 1B illustrate a cross-sectional top view and a cross-sectional side view of an exemplary photonic optical system 100, respectively. Photonic optical system 100 includes a PIC 110. The PIC 110 may be any device that integrates, typically by processes of semiconductor fabrication, one or more photonic components configured to perform certain photonic functionalities onto a semiconductor or dielectric substrate. The PIC 110 is configured to process information that is imposed onto optical beams that typically have wavelengths ranging from the UV spectrum to the infrared spectrum. The PIC 110 may be fabricated with any suitable material, including, but not limited to, silicon nitride (SiN) on silicon, silicon dioxide ($SiO_2$) on silicon, silicon on insulator (SOI), various polymers and compound semiconductor materials such as gallium arsenide (GaAs), indium phosphide (InP), and gallium nitride (GaN). Integrated photonic components can include, but are not limited to, optical beam splitters, optical wavelength filters, optical resonators, optical waveguides, optical wavelength multiplexers, optical couplers, optical polarizers, optical isolators, polarization rotators, photodetectors, optical amplifiers, lasers, light-emitting devices, etc. All optical components are typically elements that directly interact with light.

The photonic optical system 100 includes a substrate 112, on top of which one or more cladding layers 114 may be supported. The substrate 112 may be fabricated with any suitable material including silicon, gallium arsenide (GaAs), indium phosphide (InP), and silicon dioxide ($SiO_2$) for example. The thickness of the substrate 112 may be dependent upon fabrication technology and/or application. Typically, the thickness of the substrate layer 112 is that of a typical semiconductor chip ranging from 100 μm to 1000 μm.

It is understood that although only one cladding layer 114 is shown in FIG. 1, the photonic system 100 may include two or more such layers. The cladding layer 114 may be fabricated with any suitable cladding material, such as $SiO_2$, SiN, and gallium aluminum arsenide (GaAlAs) for example. The PIC 110, which includes one or more functional optical elements such as modulators, switches, and detectors (not shown), may be formed in the cladding layer 114 by any suitable means such as etching (mechanical or chemical), engraving, and/or lithography into the upper surface of the cladding layer 114. Optionally, after fabrication of the PIC 110, a top cladding layer may be formed on top of the cladding layer 114 such that the PIC 110 and the coupler 120 are encased within cladding material as shown In FIG. 1B. Having the PIC 110 and the optical coupler 120 integrated into the same cladding layer 114 may permit a simplified one-step fabrication process. Further, the one-layer design also obviates the need for additional optical device layers as needed by other multi-waveguide couplers with complicated and multistage lithography and/or etching. The cladding layer 114 and the substrate 112 are formed with materials having contrasting refractive indices (e.g., the waveguide material having higher refractive index and the cladding material having lower refractive index) such that an optical signal may be substantially confined inside of any optical routing waveguides thereon by means of total internal reflection.

An optical coupler 120 in accordance with one embodiment of the present disclosure is also integrated into the cladding layer 114. The coupler 120 extends from a chip facet 118 to the PIC 110. The optical coupler 120 is configured to receive an optical signal 122 from an optical fibre 130. In other embodiments, the coupler 120 may receive an optical signal 122 directly generated from a laser source (not shown). Upon receipt of the optical signal 122, a coupled mode is formed between the two waveguides, which propagates along the optical coupler structure and is transferred onto a routing waveguide of the PIC 110.

The optical fibre 130 is in optical communication with the optical coupler 120 at the chip facet 118. As shown, the optical fibre 130 is separated from the chip facet 118 by a free-space gap 124, which for example may be approximately 100 nm. Typically, a free-space gap 124 may exist when optical fibre 130 has an incorrectly cleaved end due to fabrication limitations, or due to physical arrangement of the optical fibre 130 for example. The free space gap 124 may increase coupling loss due to unbounded radiation of the optical signals. Alternatively, the free-space gap 124 may be negligible (i.e., the free space gap is 0 μm) and the external light source 130 is considered to be abutting the chip facet 118.

As shown in FIGS. 1A and 1B, the waveguides of the optical coupler 120 are physically exposed along the chip facet 118. In other embodiments, the waveguides of the optical coupler 120 may be recessed at some distance (i.e., 1-5 μm) away from the chip facet 118 within the cladding layer 114.

Figure 2:
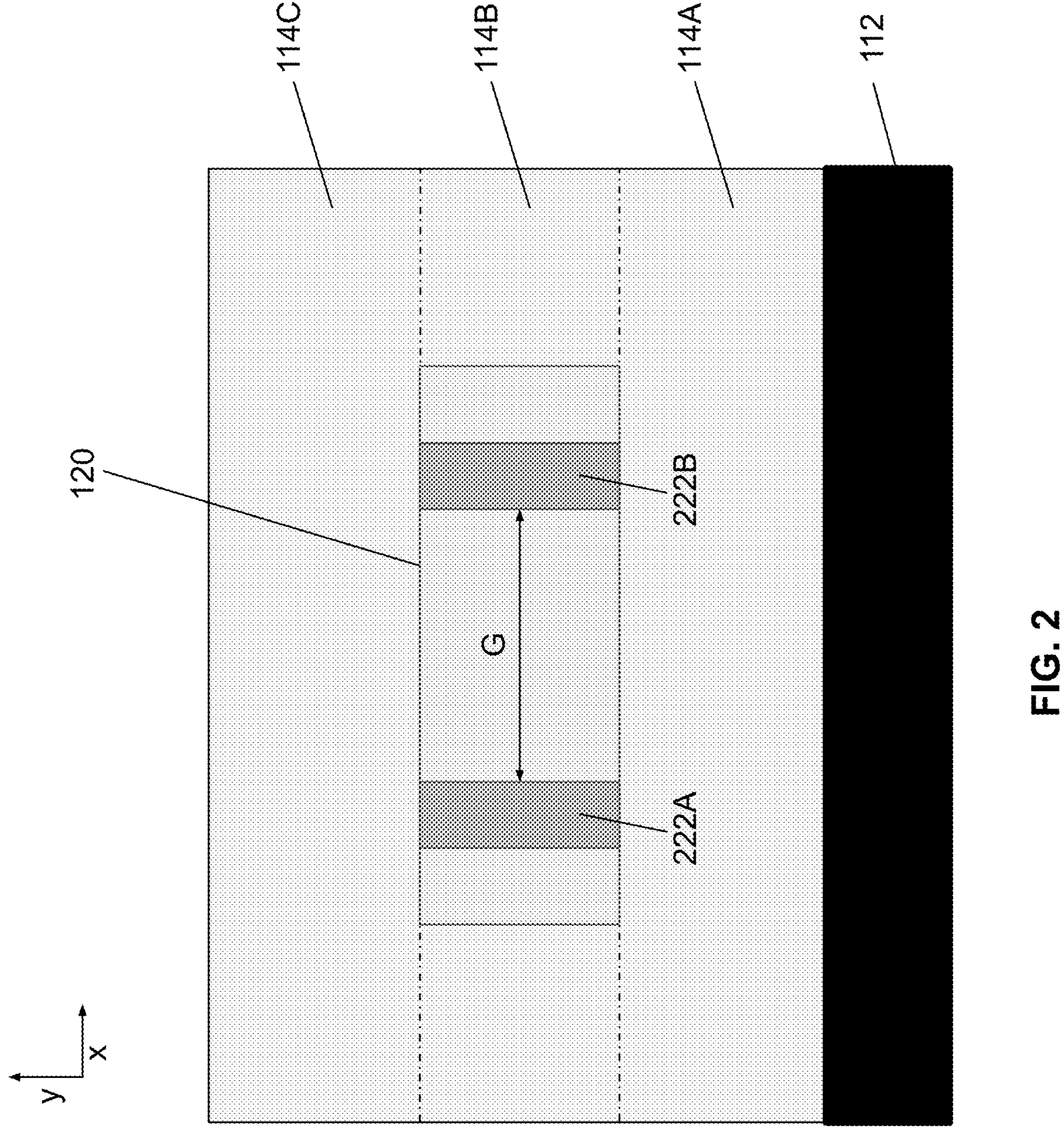
FIG. 2 illustrates a side view of the PIC shown in FIGS. 1A and 1B as seen from the chip facet.

FIG. 2 illustrates a partial elevation view of the chip facet 118 from the A-A line in FIG. 1B showing the chip facet 118 in accordance with an exemplary embodiment of the present disclosure. The optical coupler 120 includes two waveguides 222A and 222B (collectively referred to as waveguides 222) that are fabricated into the cladding layer 114B, which is supported above a cladding layer 114A formed immediately above substrate 112. The waveguides 222 are arranged substantially parallel to each other within the layer 114B separated by a transverse distance G along the x-axis. The dotted lines within FIG. 2 show conceptual boundaries of the cladding layer 114B from the cladding layer 114A and the top cladding layer 114C (collectively referred to as cladding layers 114). For brevity and clarity, the substrate layer 112 is omitted from the remaining figures.

The cladding layers 114 may be of any suitable cladding material so as to provide contrasting refractive indices with the material of the waveguides 222 such that the coupled mode transmitted within the optical coupler is optically confined by means of total internal reflection. By way of non-limiting examples, the cladding layers 114 may be any of $SiO_2$ and GaAlAs. The optical waveguides 222 may, for example, be fabricated from SiN, silicon oxynitride, air, silicon, barium titanate, lithium niobate, indium gallium arsenide phosphide (InGaAsP), gallium arsenide (GaAs), or any suitable material to achieve total internal reflection with the selected cladding material. In one preferred embodiment, the cladding layers 114 are fabricated from the same cladding material such that the optical waveguides 222 are surrounded by a homogenous cladding material with a uniform refractive index. In further embodiments, one or more of the cladding layers 114 may be fabricated with different materials having different refractive indices.

Figure 3A:
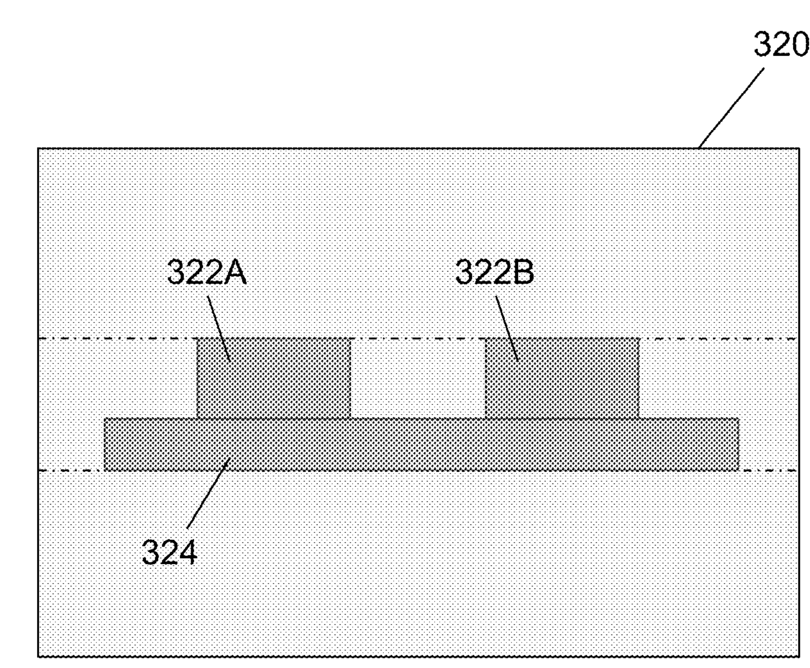
FIG. 3A illustrates one embodiment of the partially etched waveguides having a continuous waveguide shoulder.
Figure 3B:
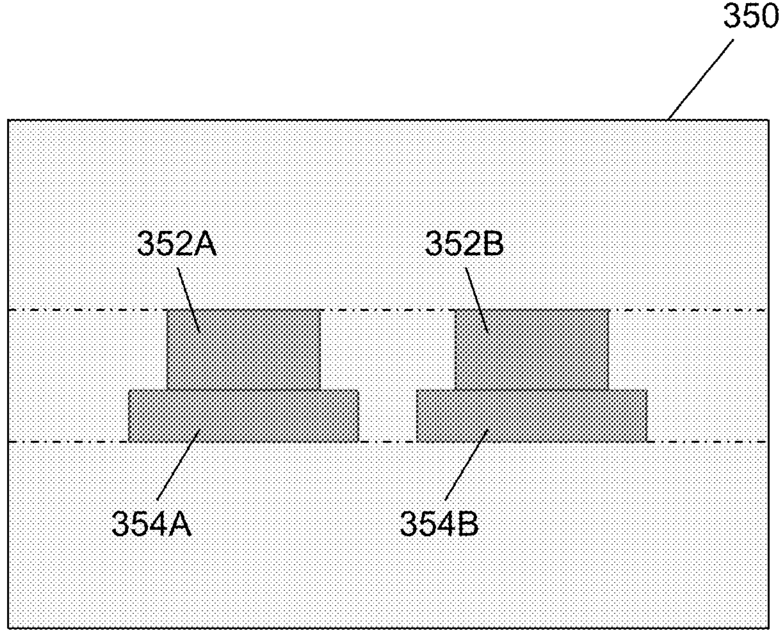
FIG. 3B illustrates one embodiment of the partially etched waveguides having separated waveguide shoulders.

FIG. 2 shows "fully etched" waveguides 222 where the waveguide material extends through the entire thickness of the cladding layer 114B. One of the dominant causes of insertion loss (e.g., from scattering of light) within the waveguide stems from roughness of the waveguide sidewalls that may result from the etching and material deposition or growing process. Thus, the fully etched waveguides (also known as strip waveguides), such as the ones shown in FIG. 2, have greater sidewall area and may be prone to elevated levels of insertion loss due to sidewall roughness. FIGS. 3A and 3B show alternative embodiments of the optical couplers 320 and 350 having "partially etched" waveguides (also referred to as ribbed waveguides). FIG. 3A shows an optical coupler 320 in accordance with embodiments of the present disclosure having partially etched waveguides 322A and 322B formed onto a continuous waveguide shoulder 324. FIG. 3B shows another optical coupler 350 in accordance with another embodiment of the present disclosure having partially etched waveguides 352A and 352B having separated waveguide shoulders 354A and 354B, respectively. Compared to the strip waveguides, the ribbed waveguides provide a smaller sidewall surface and hence may suffer less insertion loss during signal transmission.

Although each of FIGS. 2, 3A, and 3B show waveguides 222, 322, and 352 as having a substantially rectangular cross-sectional profile having substantially vertical sidewalls at the chip facet 118, the waveguides may have other profiles due to factors such as fabrication limitations. For example, the waveguides 222, 322, 352 may have outwardly sloping side walls leading to a trapezoidal cross-sectional tip profile or have inwardly sloping sidewalls and an inverted trapezoidal cross-sectional tip profile. The sloping angles of the left and right side walls may be substantially similar, leading to a substantially regular trapezoidal cross-section. Alternatively, the sloping angles of the side walls may be different so that the cross-sectional area of the waveguide is of an irregular quadrilateral shape.

FIG. 4 illustrates a cross-sectional top view of the optical coupler 420 showing the longitudinal profiles (i.e., along the z-axis) of the waveguides. FIG. 4 has been prepared for illustration purposes and may not show the various elements therein in a proportional manner. The two waveguides 422A and 422B (collectively referred to as waveguides 422) are substantially parallel to each other along the longitudinal direction of the coupler 420.

The optical coupler 420 may be conceptualized as having five operational regions, regions 1 to 5, as defined based on the optical interaction and functions of the coupled optical mode in the waveguides 422 therein. The regions are defined for the benefit of understanding the operations of the optical coupler 420 and there may not be any physical boundaries or delineations between regions within the device.

Functionally, region 1 is defined as the portion of optical coupler 420 where the coupled optical mode between the waveguides 422 is formed. In region 1, both waveguides 422A and 422B are characterized by having respective extension portions 402A and 402B (collectively referred to as extension portions 402) that extend from the chip facet 118 to a plane 1-2 (the plane parallel to the xy-plane between region 1 and region 2). FIG. 4 shows an embodiment where the extension portions 402 are flush with the chip facet 118. In other embodiments where the extension portions 402 are recessed from the chip facet 118, region 1 may be preceded by a segment of cladding material. Upon receiving the input optical signal 412 from the fibre 430, a coupled optical mode is formed between the waveguides 422A and 422B. Preferably, the modal field is symmetric, as asymmetric modal fields result in poor coupling due to a low optical overlap integral.

The mode size and optical properties of the output optical signal 432 are also defined in region 1. As shown, the two extension portions 402 are characterized by having uniform widths in region 1. In a preferred embodiment, both extension portions 402 have substantially identical widths, and hence substantially the same cross-sectional dimensions within region 1. As best illustrated in FIG. 2, the tips of waveguides 422A and 422B at the chip facet 118 are separated by a transverse (i.e., along the x-axis) distance G. One or both of the parameters gap G and the waveguide width at the facet 118 (e.g., WA1, WB1—also referred to as "tip width") may be configured to define mode matching conditions of the optical coupler 420.

The optimal waveguide tip width WA1, WB1 may be defined by the thickness of the waveguide material and its optical properties. Generally, when the waveguide material has a high refractive index contrast (e.g., refractive index contrast of 3 or more) with that of the surrounding cladding material, the waveguides 422 may have a small thickness of <300 nm. Correspondingly, the thinner waveguides may require increased tip widths for mode matching with a fibre of a given MFD. Vice versa, thicker waveguides (e.g., >300 nm) may require narrower tip widths to achieve mode matching with a fibre having the same MFD. By way of a non-limiting example, for mode matching with SMF-28 class optical fibre cables, thin waveguides having thicknesses of 100-200 nm may require tip widths that are greater than (up to 160%), or equal to, the waveguide thickness. Comparatively, mode matching with the same SMF-28 class of fibres, thick waveguides having thicknesses of 400-800 nm may require tip widths less than, or equal to, the waveguide thickness. In a further example, for mode matching with a fibre having a MFD of up to 7 μm, thin waveguides may require a tip width that is 50% to 300% greater than the waveguide thickness. In the case of thick waveguides, the tip width can be smaller or equal to the film thickness depending on the mode matching of interest and available fabrication.

Figure 5:
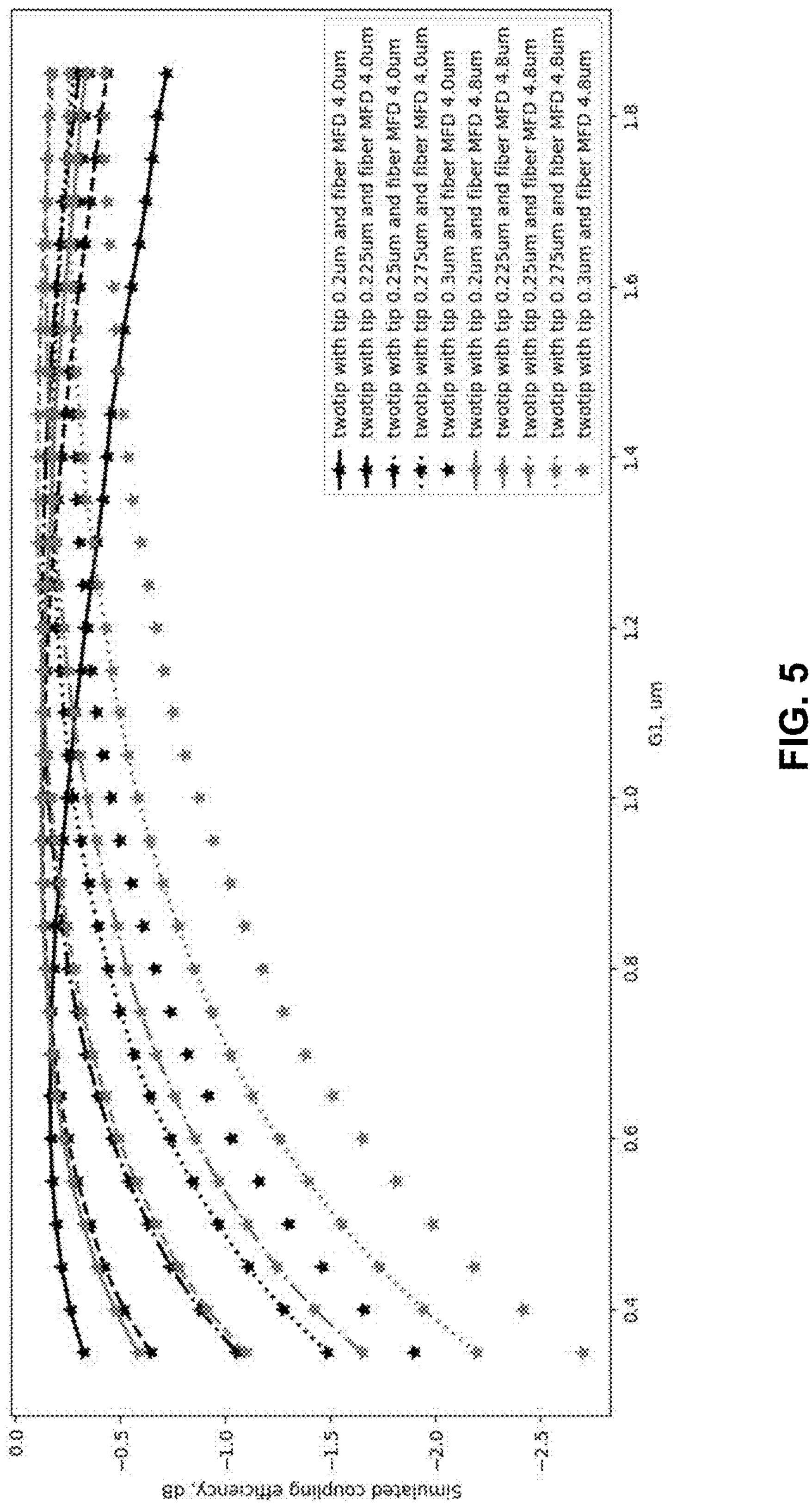
FIG. 5 illustrates simulation results of the coupling efficiency (CE) as a function of gap distance G for various waveguide tip widths and fibres with different MFDs.

Increasing the transverse distance G between the waveguides 422 may also permit better mode matching with fibre cables that have larger MFDs. However, a large distance G between the two waveguides 422 could also lead to increased insertion loss. In some preferred embodiments, the transverse distance G is in the range of approximately 0.3 μm to 3 μm. FIG. 5 illustrates simulation plots of the coupling efficiency (CE) of optical coupler 420, for various tip widths and mode matched with fibres of different MFDs, as a function of transverse distance G (or "gap" as denoted in FIG. 5) generated using Ansys Lumerical MODE®. The simulated optical coupler comprises SiN waveguides with a thickness of approximately 400 nm with tip widths ranging from approximately 0.2 μm to 0.3 μm. The grey lines denote simulation results for mode matching with fibres having an MFD of 4.8 μm and the black lines denote simulation results for mode matching with fibres having an MFD of 4.0 μm. As may be discerned from FIG. 5, for smaller tip widths, the waveguides reach optimal CE at a relatively small gap G. As the tip width increases, the required gap distance also increases, as the overall CE is reduced. Also discernible from FIG. 5 is that fibres having larger MFDs generally yield lower CE as it is more difficult to mode match and a larger gap G is needed to achieve the optimal CE. As FIG. 5 shows, by selecting the correct gap distance G and tip width in view of the fibre MFD, CE of up to −0.1 dB may be possible with embodiments of the optical coupler disclosed here within.

Returning to FIG. 4, the waveguide 422B extends from the chip facet 118 to an integrated routing waveguide of the PIC 110 (not shown), and thus serves as the main routing waveguide that is responsible for transmitting the optical mode from the facet 118 to the PIC 110. Waveguide 422B includes a widening region having an inversely tapered profile that expands from a first width WB1 at plane 1-2 to a second (terminating) width WB2 at the opposing end of the optical coupler 420. In the illustrated embodiment, the tapering angle is continuous and uniform. In other embodiments, the tapering may be in the form of discrete steps, polynomial order tapering, and other suitable types of tapering profile. The two end widths WB1 and WB2 are dictated, at least in part, by the tapering angle, which may be selected to maximize optical performance. The tapering angle may also depend on factors such as material of the waveguide and the permissible longitudinal length of the waveguide along the z-axis. Preferably, the tapering angles on both sides of the waveguide are substantially similar. However, due to fabrication limitations, the tapering angles on both sides of the waveguide may be different.

The waveguide 422A is defined as the auxiliary waveguide that includes two tapering portions—a widening portion 422A-w and a narrowing portion 422A-n. The widening portion 422A-w, which expands from a width of WA1 at plane 1-2 to a maximum intermediate width of WA2 at plane 2-3, is followed by the narrowing portion 422A-n which narrows from WA2 to a terminating width of WA3 at plane 3-4. In the illustrated embodiment, waveguide 422A also includes an optional tail portion in operational region 4 as described in more detail below. In some embodiments, the tapering angle values of the widening portion 422A-w and the narrowing portion 422A-n are substantially the same. In other embodiments, the tapering angle of the narrowing region 422A-n is different from that of the widening region 422A-w. For example, the tapering angle of the narrowing region 422A-n may be smaller than that of the widening region 422A-w, or vice versa.

Operational region 2 may be functionally defined as the region where the adiabatic mode transformation of the coupled mode begins and continues throughout the region. As the coupled mode traverses along the waveguides 422 in region 2, the confinement of the coupled mode is increased such that the mode becomes tightly coupled between the waveguides. In region 2, the tapering angle of the widening portion 422A-w differs from that of the corresponding portions of waveguide 422B (e.g., tapering angle of waveguide 422A-w<tapering angle of corresponding portions of waveguide 422B). Due to the tapering angle contrast between the two waveguides 422, the adiabatic transformation of the coupled mode onto the main waveguide 422B is initiated and continues throughout the corresponding portions of the waveguides 422. The rate of mode transformation may be defined in part by the respective tapering angles of the waveguides 422.

Operational region 3, also referred to as the decoupling region, is defined as the region where the coupled mode eventually decouples from the auxiliary waveguide 422A. Within region 3, waveguide 422A is characterized by narrowing from intermediate width WA2 towards terminal width WA3. The decoupling is primarily the result of the narrowing taper of waveguide 422A. The tapering angle difference between the two waveguides 422 defines at least in part the decoupling rate, and hence the length of region 3 may be defined, at least in part, by the intermediate width WA2 and terminal width WA3. In some embodiments, the terminal width WA3 is less than 300 nm. Typically, WA3 is dependent on the critical dimensions that may be provided by fabrication facilities. A longer region 3 may provide more efficient mode decoupling. In some embodiments, the minimum length of region 3 is 4% or more of the total longitudinal length of waveguide 422A.

The adiabatic transformation of the coupled mode continues throughout region 3 as most of the optical energy (e.g., approximately 60-90%) of the coupled mode is transformed onto the main routing waveguide 422B. As the narrowing region 422A-n begins at plane 2-3, the transformation continues but begins to have a decreased rate. By the appropriate configurations of WA2 and/or the length of regions 2 and 3, the substantially lossless propagation of the coupled mode, even for embodiments with a large gap distance G (e.g., up to 3 am), can be achieved.

The magnitude of WA2 and the overall lengths of regions 2 and 3 can be defined by several parameters, including, but not limited to:

1) The total expected length of the waveguide 422A: The length of the auxiliary waveguide can be configured to ultra-short values of, for example, up to 30-50 μm, at the cost of increased insertion loss. As the waveguide is shortened, faster mode conversion is needed by increasing the tapering angle of the widening portion 422A-w, thereby leading to increased WA2. In the case of a short waveguide 422A, with the main waveguide 422B having a linearly tapered profile, WA2 may be approximately 50-150% larger than WA1. Alternatively, in some preferred embodiments the waveguide 422B has a polynomially tapered profile of order 0.4-1.0. Decreased polynomial order of the taper would decrease WA2. For example, with a polynomial taper of order 0.4-0.6, WA2 may be approximately 20-100% larger than WA1. Conversely, a longer waveguide 422A can have a slower conversion rate with improved insertion loss, as a smaller tapering angle of the widening portion 422A-w is needed, leading to decreased WA2. In the case of a long waveguide 422A, with the main waveguide 422B having a linearly tapered profile, WA2 may be approximately 20-100% larger than WA1. With a polynomially tapered profile of the waveguide 422B of order 0.4-0.6, WA2 may be approximately 0-70% larger than WA1. Intermediate width WA2 is always greater than terminal width WA3. In some embodiments, regions 2 and/or 3 are contained within approximately the 20-70% lengthwise (along the z-axis) portion of the total waveguide 422A length.
2) The transverse distance G: Increased transverse (or gap) distance G may weaken the coupling between the two waveguides. For wider gap values G, WA2 may be increased to compensate for the weakened coupling by increasing the tapering angle. Vice versa, for the smaller gaps G, WA2 may be narrower. By way of a non-limiting example, for gaps of more than 1.5 μm, WA2 can be approximately 30-200% bigger than WA1, and for gaps less than 1.5 μm, WA2 may be approximately 0-100% bigger than WA1 independent of the refractive index contrast and polynomial order tapering.
3) Widths WB1 and WB2: Recall that in some embodiments the tapering angle of the auxiliary waveguide 422A-w is equal to or less than that of the main waveguide 422B. Thus, for example, when the ratio of WB1 and WB2 is small (e.g., when the difference between WB2 and WB1 is less than 50%), or in other words the tapering angle of the main routing waveguide 422B is smaller, WA2 may be reduced.

One or more of the above parameters may be configured independently or jointly to achieve desired optical performance in coupling efficiency and physical requirements.

Figure 6:
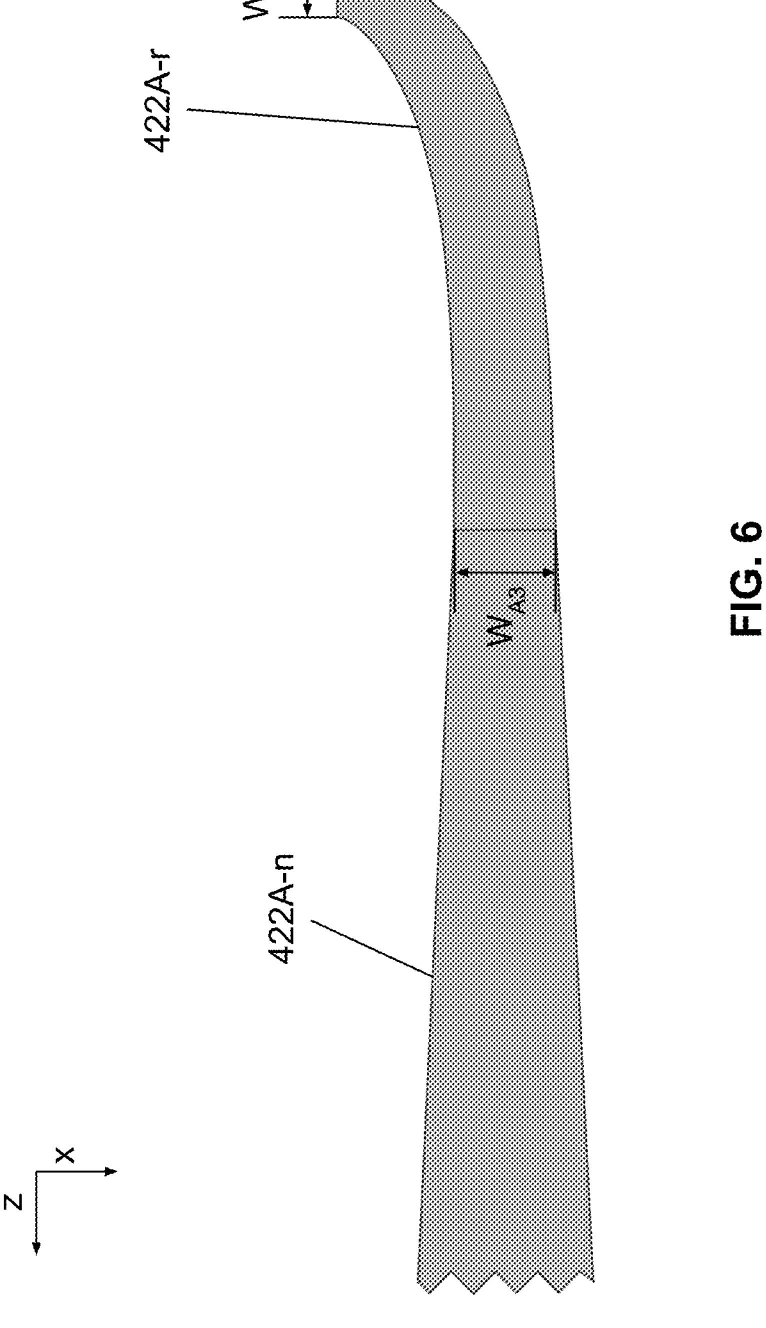
FIG. 6 illustrates an enlarged view of the radiation tip in the dotted portion A in FIG. 4.

Region 4, also referred to as the anti-reflection region, is an optional region that may be incorporated to reduce any possible reflections due to waveguide terminations in region 3. In particular, a large termination width WA3 could lead to signal reflections that may increase optical loss. Region 4 is characterized by waveguide 422A having an optional radiation tip 422A-r which is better illustrated in FIG. 6. The anti-reflection properties of the radiation tip 422A-r may be achieved by having a curved profile and/or narrowing towards a smaller tip width WA4. The embodiment in FIG. 6 shows a curved radiation tip 422A-r narrowing from the terminating width WA3 at plane 3-4 to a tip width of WA4, where WA4≤WA3. The illustrated radiation tip 422A-r has a curved profile curving away from the main waveguide 422B. The radius of curvature may be defined by the material properties of the waveguide as well as the cross-sectional area. In addition to minimizing signal reflection, the curved profile of the radiation tip 422A-r may also permit more efficient decoupling between the waveguides 422 should any residual energy of the coupled mode remain with the auxiliary waveguide 422A at the end of region 3. Alternatively, the radiation tip 422A-r may also be straight and parallel to the main waveguide 422B, and function to reduce signal reflection by having a narrowing and tapered profile. If WA3 is already at the critical dimension (i.e., the minimum dimension that can be fabricated), then the radiation tip 422A-r may be of uniform width (e.g., WA3=WA4) and utilize the curved profile away from the main waveguide 422B to minimize the signal reflection.

Returning to FIG. 4, in operational region 5, which may follow region 3 or region 4 depending on whether the optional radiation tip 422A-r is implemented, the coupled mode is now substantially transferred onto the main routing waveguide 422B. In region 5, the mode in waveguide 422B continues to expand to the desired modal size until its terminating width WB2 as the tapering of waveguide 422B continues. The longitudinal length of region 5 may be defined, at least in part, by the design parameter configurations of the decoupling region 3. For example, if near 100% of the coupled mode has been transferred onto the main waveguide 422B, then region 5 may be less than 5-10% of the total structure length. However, in some cases of slow tapering, region 5 can be 10-70% of the total structure length, particularly in cases where a slightly multimode or multimode waveguide is expected at WB2.

Figure 7:
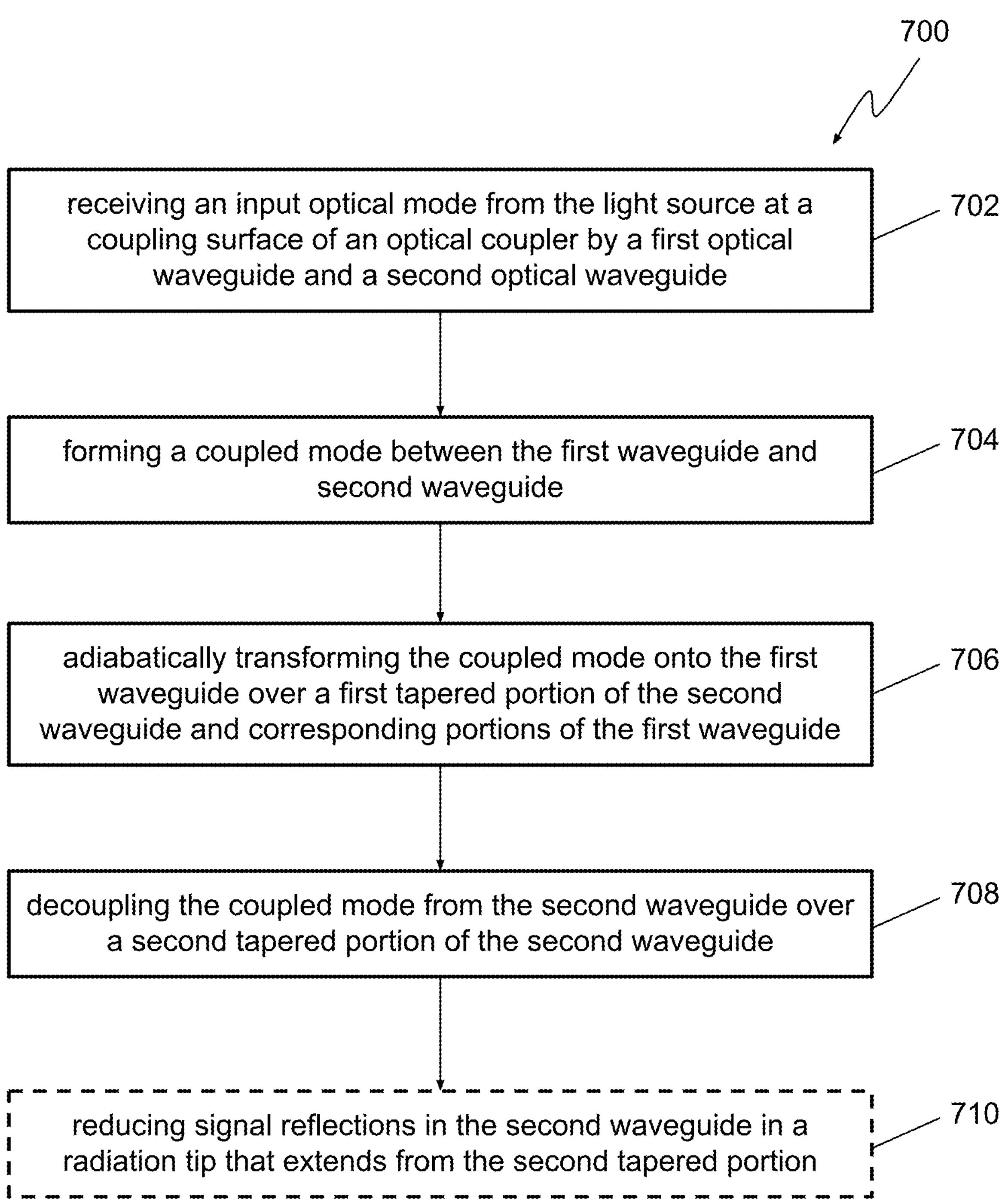
FIG. 7 illustrates a flowchart for a method of optically coupling a light source and an integrated optical circuit in accordance with embodiments of the present disclosure.

FIG. 7 shows a flowchart for a method of optically coupling a light source and an integrated optical circuit in accordance with embodiments of the present disclosure.

At 702, an input optical signal from a light source is received at a chip facet of a photonic optical device chip by an optical coupler in accordance with the present disclosure. The light source may be a light generation source such as a laser, or a transmission medium such as an optical fibre cable. The optical coupler includes two waveguides that are fabricated into the same cladding layer of the photonic device chip. The waveguides may each have a defined width at the chip facet (or "tip width") and are separated by a transverse (or gap) distance. The tip width and the transverse distance between the two waveguides may be configured to achieve desired mode matching conditions with the light source. In some embodiments, the tip widths of both waveguides are substantially the same. The first waveguide extends from its tip width to a terminal width at its opposing end. In some embodiments, the terminal width of the first waveguide is substantially equivalent to the width of a routing waveguide of a PIC also fabricated onto the same cladding layer.

At 704, the input signal causes a coupled mode to be formed between the two waveguides. The coupled mode is preferably in phase as phase asymmetry may decrease optical coupling efficiency.

At 706, the adiabatic transformation of the coupled mode onto the first waveguide begins over a first tapered portion of the second waveguide and corresponding portions of the first waveguide. The first tapered portion of the second waveguide widens from its tip width to an intermediate width, and the second tapered portion narrows from the intermediate width to a terminal width. The magnitude of the intermediate width may be configured based on one or more factors that include the total length of the second waveguide, the transverse distance between the waveguide tips, and the tip widths. The tapering angles of the first and second waveguides may be anyone of constant tapering angle, polynomial order tapering, discrete steps, and any other suitable tapering profile. The tapering angle of the first tapered portion of the second waveguide is less than that of the corresponding portions of the first waveguide.

At the end of the first tapered portion, most (e.g., approximately 60-90%) of the optical energy of the coupled mode is transformed onto the first waveguide. At 708, beginning at the second tapered portion, in which the second waveguide narrows from the intermediate width to a terminal width, the coupled mode decouples from the second waveguide over the second tapered portion of the second waveguide. At the end of the second tapered portion, substantially all of the optical energy of the coupled mode is transformed onto the first waveguide, and the optical mode is gradually enlarged to a mode size defined by the first waveguide's terminal width. In some embodiments, the terminal width of the first waveguide is substantially similar to the width of routing waveguides in the PIC.

Optionally, at 710, signal reflections, possibly due to improper termination, within the second waveguide may be reduced in a radiation tip that extends from the second tapered portion. The reflection reduction may be realized through a curved radiation tip curving away from the first optical waveguide, a continually narrowing radiation tip that narrows from the termination width of the second waveguide to an even smaller tip width, or a combination of the two.

Although the present disclosure may describe methods and processes with steps in a certain order, one or more steps of the methods and processes may be omitted or altered as appropriate. One or more steps may take place in an order other than that in which they are described, as appropriate.

Although the present disclosure may be described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. An optical coupler having at most two optical waveguides, the optical coupler comprising:

a substrate;

a cladding layer supported above the substrate, the cladding layer and the substrate defining a facet;

a first optical waveguide arranged within the cladding layer, the first optical waveguide configured with a first tapering angle; and a second optical waveguide arranged substantially parallel to the first optical waveguide and spaced apart from the first optical waveguide by a transverse distance at the facet, the second optical waveguide comprising a first tapered portion with an increasing tapering angle, the increasing angle is less than the first tapering angle, and a second tapered portion with a decreasing tapering angle, thereby defining a first operating region and a second operating region, wherein a coupled mode formed between the first optical waveguide and the second optical waveguide from an incoming optical signal is transmitted along the first and the second optical waveguides, the confinement of the coupled mode increases in the first operating region, and the coupled mode is transformed onto the first optical waveguide, and gradually decoupled from the second optical waveguide over the second operating region.

2. The optical coupler of claim 1, wherein the first optical waveguide widens from a first tip width at the facet to a first terminating width at a first terminal end.

3. The optical coupler of claim 2, wherein the first tapered portion widens from a second tip width to an intermediate width; and the second tapered portion narrows from the intermediate width to a second terminating width at a second terminal end.

4. The optical coupler of claim 3, wherein the first tip width is substantially equal to the second tip width.

5. The optical coupler of claim 1, wherein each of the first optical waveguide and the second optical waveguide further comprises an extension portion, respectively.

6. The optical coupler of claim 5, wherein the extension portion of each of the first and second optical waveguide is of uniform width.

7. The optical coupler of claim 3, wherein one or more of the transverse distance, the first tip width, and the second tip width are configured to mode match with the incoming optical signal at the facet.

8. The optical coupler of claim 1, wherein the first optical waveguide and the second optical waveguide are ribbed waveguides.

9. The optical coupler of claim 1, wherein the second operating region has a length of at least 4% of a total length of the second optical waveguide.

10. The optical coupler of claim 1, wherein the second optical waveguide further comprises a radiation tip extending from the second tapered portion, the radiation tip configured to reduce optical reflections within the second optical waveguide.

11. The optical coupler of claim 10, wherein the radiation tip is configured with one or more of a curved profile and a narrowing tip.

12. The optical coupler of claim 1, wherein the first tapering angle, the increasing tapering angle, and the decreasing tapering angle is one of a constant tapering angle, a polynomial tapering angle, and a discrete step tapering angle.

13. A method of optically coupling a light source and an optical circuit, the method comprising:

receiving an input optical mode from the light source at a chip facet of an optical coupler by a first optical waveguide and a second optical waveguide, the optical coupler having at most two optical waveguides;

causing an optical mode to be optically coupled between the first optical waveguide having a first tapering angle and the second optical waveguide;

optically confining the coupled mode between the first and second waveguides;

transforming the coupled mode onto the first optical waveguide over a first operating region defined by a first tapered portion of the second optical waveguide having an increasing tapering angle; and decoupling the coupled mode from the second optical waveguide over a second operating region defined by a second tapered portion of the second optical waveguide having a decreasing tapering angle.

14. The method of claim 13 further comprising reducing reflections in the second optical waveguide with a radiation tip that extends from the second tapered portion.

15. The method of claim 13 further comprising configuring one of a gap distance between the first optical waveguide and the second optical waveguide at the chip facet, a first width of the first optical waveguide at the chip facet, and a second width of the second optical waveguide at the chip facet for mode matching with the input optical mode.

16. The method of claim 13, wherein the first optical waveguide is configured with a first tapering angle greater than the increasing tapering angle of the first tapered portion of the second optical waveguide.

17. The method of claim 13 further comprising configuring the first tapered portion to extend from a first width to a second width;

configuring the second tapered portion to extend from the second width to a third width; and configuring the second width based on one or more of a total length of the second optical waveguide, a gap distance between the first and the second optical waveguides at the chip facet, and tip widths of the first and second optical waveguides at the chip facet.

18. The method of claim 16, wherein any one of the first tapering angle, the increasing tapering angle, and the decreasing tapering angle is configured with one of a constant tapering angle, a polynomial tapering angle, and a discrete step tapering angle.

* * * * *